United States Patent Office 3,421,978
Patented Jan. 14, 1969

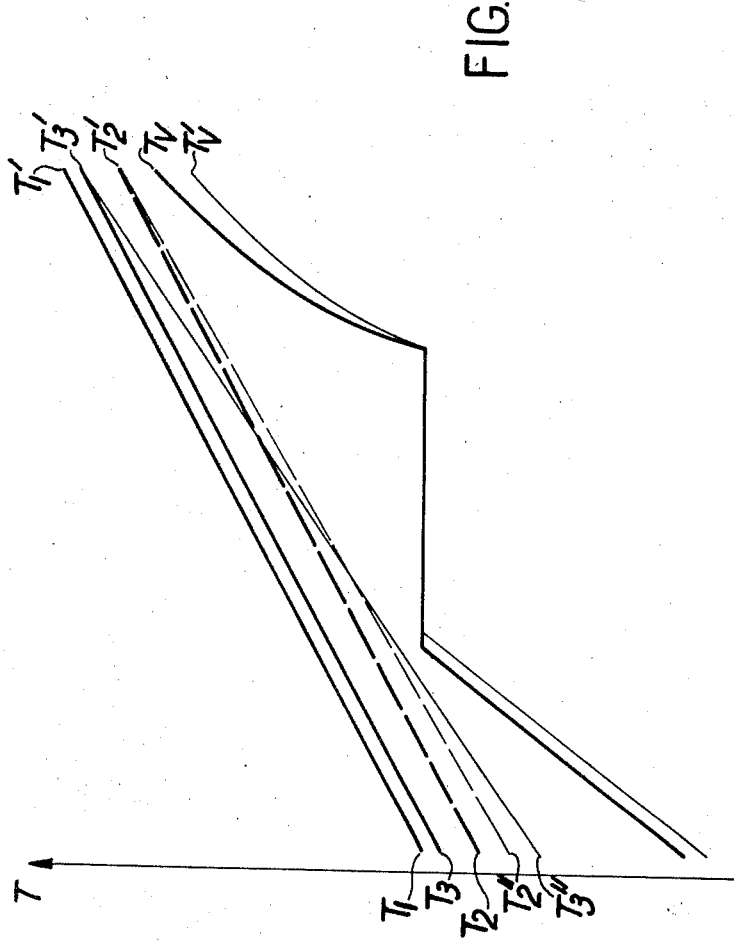

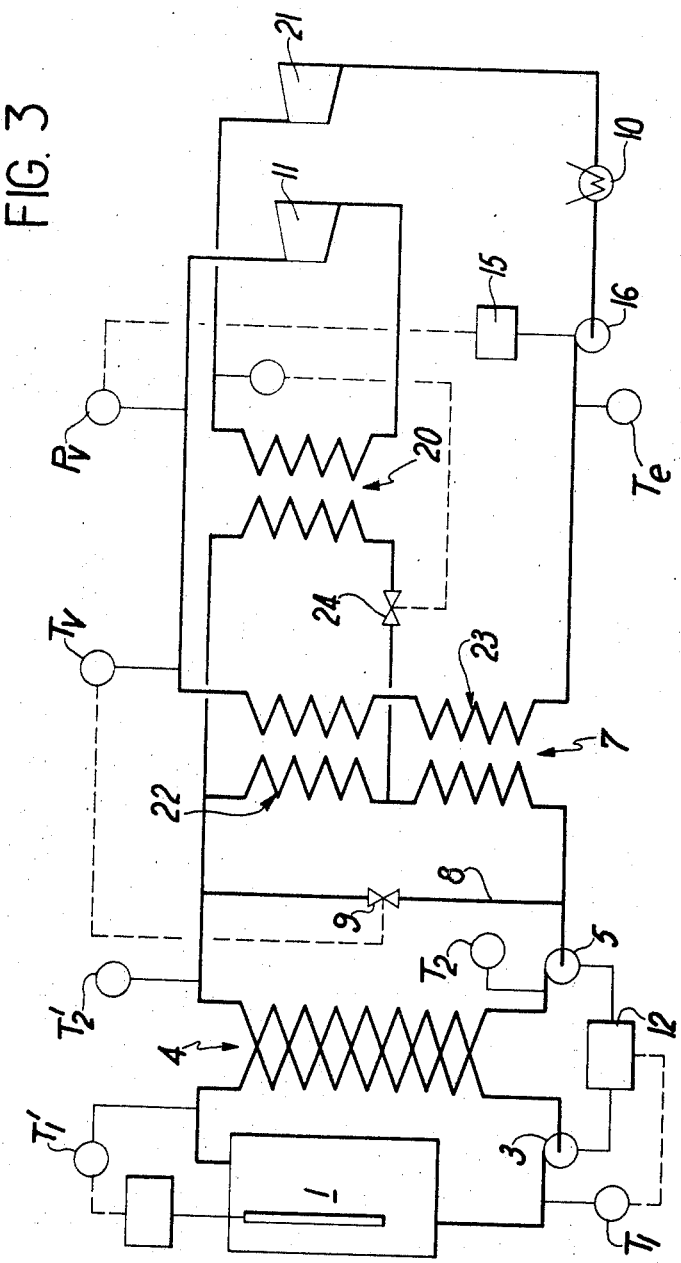

3,421,978
THERMAL POWER PLANT AND METHOD OF OPERATION
Henri-Jacques Gollion, Aix-en-Provence, Marcel Robin, Paris, and Bernard Schwab, Bourg-la-Reine, France, assignors to Commissariat à l'Energie Atomique, Paris, France
Filed Apr. 17, 1967, Ser. No. 631,274
Claims priority, application France, Apr. 29, 1966, 59,793
U.S. Cl. 176—65      6 Claims
Int. Cl. G21c *19/28; 15/00*

ABSTRACT OF THE DISCLOSURE

A method for the production of power from a heat source such as a nuclear reactor cooled by a liquid metal comprising circulating a primary fluid between said heat source and a heat exchanger, circulating a secondary fluid between said heat exchanger and a steam generator and circulating a working fluid through said steam generator in which said working fluid vaporizes. A fraction of the secondary fluid flow is by-passed outside said steam generator and said fraction is regulated at each moment so as to maintain at a constant predetermined value either the temperature or the pressure of the stream produced in said steam generator.

---

Figure 1:
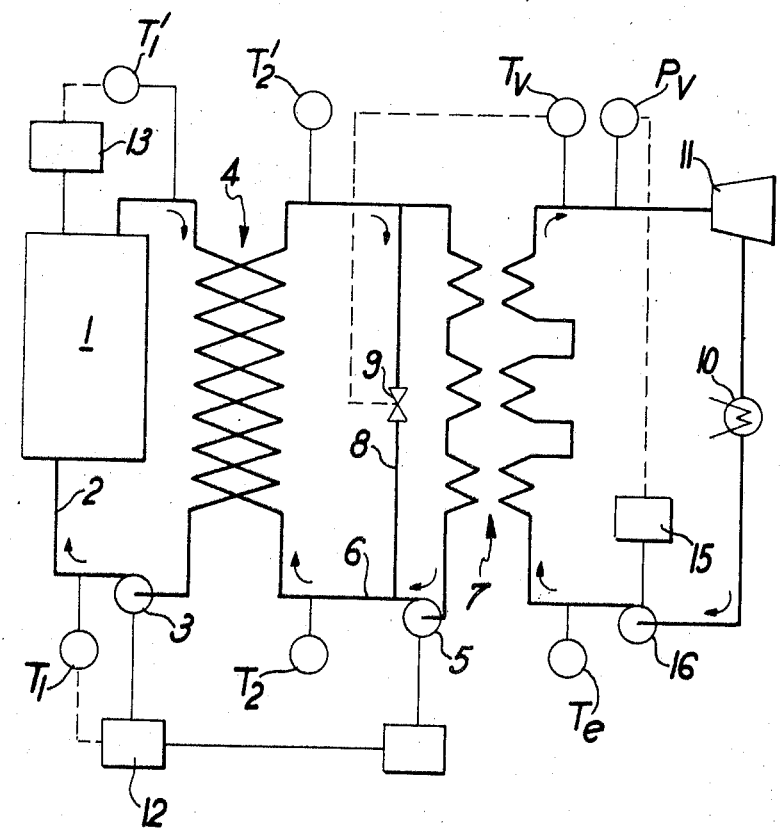

This invention relates to a plant for the production of power from a heat source constituted in particular by a nuclear reactor, and is also directed to a method of operation of the thermal power plant under consideration or of any similar power-generating facility.

More specifically, the invention is concerned with a thermal power plant comprising a primary fluid circuit between a heat source and a heat exchanger, a secondary fluid circuit between said heat exchanger and a steam geneartor, and a utilization circuit through which a fluid passes and vaporizes in said steam generator. The invention is of particular interest for power production plants which utilize the heat generated by a nuclear reactor of the liquid metal cooled type.

The conventional methods of operation of a plant of this type usually consist in maintaining constant the temperatures of the primary fluid at the inlet and at the outlet of the heat exchanger by regulating the thermal power yielded in the heat exchanger as well as the rate of flow of primary fluid, in additionally maintaining constant both the steam generator feedwater temperature and the steam pressure by regulating the rate of flow of the feedwater, and in regulating the flow of secondary fluid, for example in dependence on the difference in temperatures of the secondary fluid at the outlet and at the inlet of the intermediate heat exchanger so as to maintain said difference at a constant value.

One major disadvantage of these methods lies in the freedom of variation in the temperature of the steam which is available at the outlet of the steam generator and which is supplied to the power production turbines.

In order to overcome this disadvantage, it has been proposed to regulate at each instant the ratio of the flow of secondary fluid to the flow of primary fluid in such a manner as to maintain the steam temperature at a constant predetermined value.

It should be noted that the same methods could be adopted for the purpose of regulating the steam pressure, in which case the temperature of the steam is maintained constant by regulating the feedwater flow. However, this solution is less commonly employed.

The fact of establishing a different law of simple proportionality between the flow rates of primary and secondary fluids is nevertheless attended by disadvantages. In particular, the pumps of the primary and secondary circuits cannot be driven by synchronous motors. Moreover, any reduction in the ratio of secondary flow to primary flow, for example, would result not only in a corresponding increase in the difference between the hot and cold temperatures of the secondary fluid but also in an increase in the hot temperature which would provide partial compensation for the effect of reduction of the cold temperature. This phenomenon is detrimental to accuracy of regulation.

This invention is intended to overcome the disadvantages noted in the foregoing while retaining the possibility of maintaining constant the temperature of the working fluid at the outlet of the steam generator.

To this end, the invention proposes a thermal power plant comprising a primary fluid circuit between a heat source and a heat exchanger, a secondary fluid circuit between said heat exchanger and a steam generator, and a utilization circuit through which a fluid passes and vaporizes within said steam generator, said plant being essentially characterized in that said secondary circuit comprises a by-pass duct across said steam generator and means for regulating the fraction of the secondary fluid flow which passes through said by-pass duct.

The invention further proposes a method of operation of a thermal power plant comprising circulating a primary fluid between a heat source and a heat exchanger, circulating a secondary fluid between said heat exchanger and a steam generator whilst a fraction of the secondary fluid flow is by-passed outside said steam generator, and circulating a working fluid through said steam generator in which said fluid vaporizes, and regulating said fraction of the secondary fluid at each instant so that the temperature (or the pressure) of the steam produced within the steam generator is maintained by regulation at a constant predetermined value.

According to a preferred mode of execution of the method, the rates of flow of primary and secondary fluid within the heat exchanger are maintained substantially proportional to each other. The corresponding pumps can thus be driven by synchronous motors from a single mains supply at variable frequency. Furthermore, the temperatures of the primary fluid at the inlet and at the outlet of the heat exchanger remain constant.

One particular mode of execution of the invention is described hereinafter by way of example, reference being made to the accompanying drawings which are not intended to imply any limitation, and in which:

FIG. 1 is a diagrammatic view of a first mode of execution of the invention;
FIG. 2 shows as a function of the load the variations in temperature within the steam generator, the secondary circuit, and the primary circuit;
FIG. 3 represents a second mode of execution.

The plant according to the invention which is shown in FIG. 1 is designed to produce electric power from the heat generated by a nuclear reactor which is cooled by a liquid metal such as, in particular, liquid sodium.

Liquid sodium which constitutes the primary fluid is circulated by a pump 3 within a primary loop 2 so as to pass through the reactor 1 at a temperature which rises across the reactor from $T_1$ to $T'_1$, and is then cooled within the intermediate heat exchanger 4.

Said primary fluid then yields its heat to a secondary fluid which also consists of liquid sodium and is circulated by a pump 5 within the secondary loop 6. Said secondary fluid increases in temperature from $T_2$ to $T'_2$ and is then cooled in the steam generator 7 to a temperature $T_3$. The secondary loop 6 comprises a duct 8 which bypasses the steam generator 7. Said by-pass duct 8 is fitted with a valve 9 for regulating the rate at which the secondary fluid flows through said duct.

The working fluid consists of water which is delivered at a constant temperature $Te$ by the pump 16 towards the steam generator 7 in which it is successively heated then vaporized and superheated. Steam is delivered from the generator at a temperature $Tv$ and at a pressure $Pv$, then directed to a turbine 11. After expansion within the turbine, the steam is condensed within the condenser 10, then returned to the generator 7.

The plant herein described additionally comprises a regulating unit which, on the one hand, ensures stable operation of the plant in the steady state and, on the other hand, makes it possible to maintain the different parameters within a narrow range of variation when the load on the plant varies between its minimum and maximum limits (20% to 110% of the reactor power, for example).

The operation of the steam turbines makes it necessary to maintain constant the temperature $Tv$ and the pressure $Pv$ of the steam. In addition, taking into account the influence of the temperature on the reactor structures and on reactivity changes, it is an advantage to maintain constant the primary fluid inlet temperature $T_1$ and outlet temperature $T'_1$.

The temperature $T_1$ of the primary fluid at the reactor inlet is maintained constant by a regulator 12 which modifies the delivery of the pump 3. The temperature $T'_1$ of the same fluid at the reactor outlet is also maintained constant by the regulator 13 which produces action on the reactor control rods.

So far as concerns the utilization circuit, the temperature of the water which is conveyed to the steam generator is maintained constantly at the value $Te$ and the steam pressure is maintained constant by the regulator 15 which modifies the delivery of the pump 16.

On the other hand, the flow rate of the steam varies according to the load on the turbine.

So far as concerns the steam temperature $Tv$, this temperature is maintained constant by regulating the flow of secondary fluid which passes through the by-pass duct 8.

The possibility of maintaining the temperature $Tv$ constant results from different variations in the secondary fluid flow within the intermediate heat exchanger 4 and within the steam generator 7, these different variations being permitted by the by-pass duct 8. The above-mentioned possibility also results from the following considerations:

(a) in the steam generator, under conditions of constant power transfer and constant water flow, a variation in the flow rate of secondary fluid results in an inverse variation of the temperature difference $T'_2-Tv$ (as shown in FIG. 2).

For example, in order to reduce $Tv$, the rate of flow of fluid through the by-pass duct is increased, which has the result of increasing the temperature difference of the secondary fluid between the inlet and outlet of the steam generator. Thus, $T_2$ becomes $T''_2$ and $Tv$ consequently becomes $T'v$.

(b) if the flow rates of the primary and secondary fluids (as well as the water flow rate) vary in the same ratio as the load on the plant, the temperature differences $T'_1-T_1$ and $T'_2-T_2$ remain constant but the temperature differences $T'_1-T'_2$ and $T'_2-Tv$ vary in the same direction as the load variations.

In the case of low-power operation, for example, the temperatures of the secondary fluid increase and become $T_3$ and $T'_3$; any increase in $Tv$ is thus prevented by increasing the by-pass flow rate and $T_3$ becomes $T''_3$.

In the particular case herein described, the valve 9 is controlled in dependence on the indicator which records the steam temperature $Tv$, and the flow rate of secondary fluid within the circuit 6 is maintained proportional to the flow rate of primary fluid within the circuit 2. To this end, the secondary circuit can comprise a device for regulating the delivery of the pump 5; said delivery is controlled, for example, in dependence on the difference in hot and cold temperatures of the secondary fluid which flows through the intermediate heat exchanger 4 (namely $T'_2-T_2$).

However, in the particular mode of execution described, it has been considered preferable not to provide separate regulation of the secondary fluid pump 5 but rather to drive said pump and the primary fluid pump 3 from synchronous motors suplied by a single main current source at a variable frequency which may, for examle, be controlled by the regulator 12.

By way of alternative, the rate at which the secondary fluid flows through the by-pass duct 8 can be controlled either in dependence on the steam pressure at the outlet of the generator or in dependence on the temperature $T'_2$ of the secondary fluid at the outlet of the intermediate heat exchanger.

FIG. 3 illustrates another mode of execution of the invention in which the steam of the utilization circuit is subjected to resuperheating between two successive expansions.

The primary circuit and the intermediate heat exchanger 4 are identical with those of the previous embodiment. On the other hand, the steam generator 7 comprises a resuperheating zone 20. In this zone, the steam of the utilization circuit which has already been partially expanded in the turbine 11 is resuperheated by exchange with a fraction of the secondary fluid flow. Expansion is then completed in a low-pressure turbine 21. The remainder of the utilization circuit is identical with that which has been described in the embodiment of FIG. 1.

The secondary fluid circuit also has the same by-pass duct 8 across the steam generator. The temperature which is maintained constant by regulating the flow of secondary fluid through said by-pass duct 8 (by means of the valve 9) is the same as that of the superheated steam delivered from the steam generator upstream of the high-pressure turbine 11. Similarly, as in the previous embodiment, the pressure of said steam is maintained constant by regulating the flow of the pump 16.

In the secondary fluid circuit, the resuperheating zone 20 is disposed in parallel with a superheating zone 22 whilst the entire flow of secondary fluid passes through the section 23 in which resuperheating and vaporization of the feedwater take place. The distribution of the flow between the superheating zone 22 and the resuperheating zone 20 is regulated by means of a valve 24 so as to maintain constant the temperature of the resuperheated steam upstream of the low-pressure turbine 21.

What we claim is:

1. A thermal plant for the production of power from a heat source comprising a primary fluid circuit between a heat source and a heat exchanger, a secondary fluid circuit between said heat exchanger and a steam generator, a utilization circuit through which a working fluid passes and vaporizes within said steam generator, said secondary circuit comprising a by-pass duct across said steam generator, means for regulating the fraction of the secondary fluid flow which passes through said by-pass duct, said utilization circuit comprising a high-pressure turbine and a low-pressure turbine, means for circulating the working fluid between said two turbines in a re-superheating zone of said steam generator and said secondary fluid circuit including means for regulating the flow of secondary fluid which passes through said re-superheating zone.

2. A method of operation of a thermal power plant comprising the steps of circulating a primary fluid of liquid metal between a nuclear reactor and a heat exchanger, circulating a secondary fluid between said heat exchanger and a steam generator, circulating a working fluid through said generator in which said working fluid vaporizes, by-passing a fraction of the secondary fluid flow across said steam generator, regulating said fraction at each moment to maintain at a constant predetermined value a first of two parameters comprising the temperature and pressure of the steam produced in said steam generator, the rates of flow of primary fluid and secondary fluid through said heat exchanger being maintained proportional to each other.

3. The method as described in claim 2, the second parameter being maintained at a constant predetermined value by regulating the flow of working fluid supplied to the steam generator.

4. The method as described in claim 2, the value of that fraction of the total flow of secondary fluid from the steam generator being governed by the steam temperature at the outlet of the generator.

5. The method as described in claim 2, the minimum temperature of the primary fluid being maintained at a constant predetermined value by regulating the flow of said primary fluid.

6. The method as described in claim 2 including the steps of providing two successive expansions of the working fluid at a high pressure turbine and at a low pressure turbine and then resuperheating said fluid between said expansions by a part of the secondary fluid flow and regulating the volume of said part of the secondary fluid flow to maintain constant the temperature of the resuperheated steam.

References Cited

UNITED STATES PATENTS

| 3,152,048 | 10/1964 | Forsyth | 176—20 |
| 3,153,618 | 10/1964 | Acklin | 176—20 |
| 3,161,572 | 12/1964 | Kagi | 176—60 X |

FOREIGN PATENTS 897,416   5/1962   Great Britain.

OTHER REFERENCES

R. J. Beeley et al., article in "Small and Medium Power Reactors," vol. 1, pp. 598, 607, 608. Pub. by International Atomic Energy Agency, Vienna, Austria, 1961.

REUBEN EPSTEIN, *Primary Examiner.*

U.S. Cl. X.R.

176—20; 60—2; 122—33; 60—104